June 23, 1959

M. G. LEONARD 2,892,127

CIRCUIT BREAKER DEVICES

Filed May 7, 1956

WITNESSES
Edwin E. Bassler
Wm. B. Sellers.

INVENTOR
Merrill G. Leonard
BY Paul H. Harbex.
ATTORNEY

United States Patent Office 2,892,127
Patented June 23, 1959

2,892,127

CIRCUIT BREAKER DEVICES

Merrill G. Leonard, Fowler, Ohio, assignor to Westinghouse Electric Corporation, East Pittsburgh, Pa., a corporation of Pennsylvania Application May 7, 1956, Serial No. 583,193

10 Claims. (Cl. 317—35)

This invention relates to circuit breakers and to the protection of distribution transformers by circuit breakers.

The protection of the high voltage side of a distribution transformer by means of a circuit breaker, due to the high currents involved, would require a circuit breaker of such high interrupting capacity as to make the breaker impractical both as to size and cost. The maximum possible fault current on the high voltage side of distribution transformers is not limited by the impedance of the transformer, as is the case on the low voltage side, but is limited only by the impedance of the feeder circuit. Hence, currents of 10,000 amperes or more might be reached and it would require a much larger circuit breaker to interrupt such high currents than would be practical both as to size and cost. This difficulty can be overcome by the provision of a circuit breaker that is required to interrupt overload currents up to a predetermined magnitude only, which remains closed when a fault current of greater magnitude occurs and which acts as a disconnect switch to open the circuit when the fault current drops to zero due to the functioning of a back-up protective device such as a reclosing circuit breaker.

An object of the invention is to provide a circuit breaker embodying a novel trip device which trips the breaker in response to overload currents up to a predetermined value and locks the breaker against tripping in response to overload currents above said predetermined value.

Another object of the invention is to provide a circuit breaker embodying a novel trip device responsive to overload currents below a predetermined value to trip the breaker after a time delay and having electromagnetic lock-in means responsive to fault currents above the predetermined value to prevent opening of the breaker.

Another object of the invention is to provide a circuit breaker according to the preceding paragraphs in which the lock-in means effects opening of the breaker after the fault has been cleared.

The invention both as to structure and operations, together with additional objects and advantages thereof, will be best understood from the following detailed description thereof when read in conjunction with the accompanying drawing.

Figure 1:
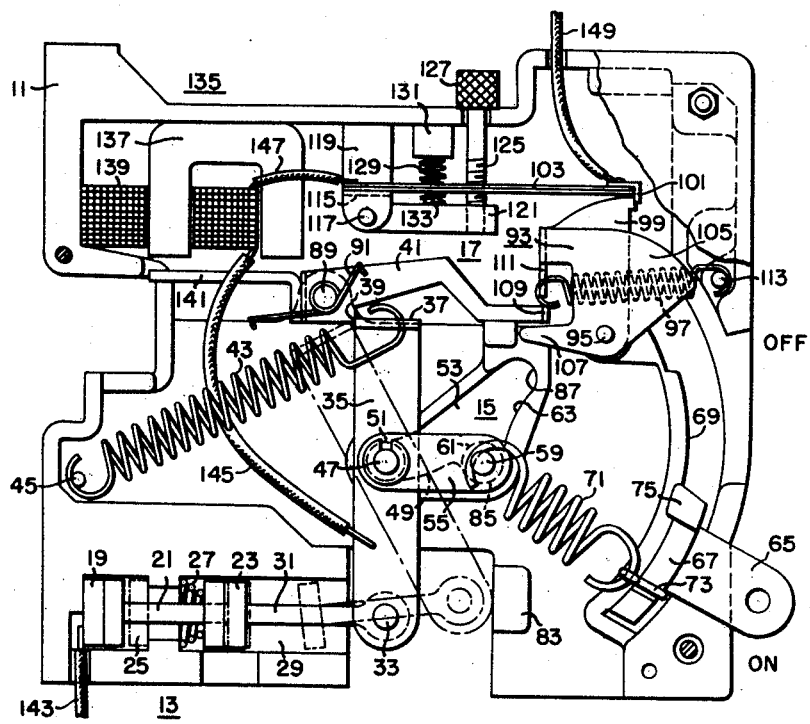
Figure 1 is an elevational view of a circuit breaker embodying the principles of the invention.

The invention is illustrated as applied to a circuit breaker having an operating mechanism of the general type fully disclosed in Patent No. 2,686,242, issued August 10, 1954, to Merrill G. Leonard and Arthur M. Lockie and assigned to the assignee of the present invention, but the invention, in its broader aspects, may be applied to other types of circuit breaker mechanisms.

Referring to the drawing, the circuit breaker comprises a base or housing member 11 of insulating material on which are mounted the parts of the breaker mechanism including stationary and movable contact structure indicated generally at 13, operating mechanism indicated generally at 15, and a trip device 17. The contact structure comprises a stationary contact 19, an intermediate contact 21 and a movable contact 23. The stationary contact 19 is rigidly mounted in an arc quenching chamber 25 formed in the housing 11. The intermediate contact 21 is disposed between the stationary contact 19 and the movable contact 23 and is biased in opening direction by a spring 27.

The movable contact 23 is disposed in an arc quenching chamber 29 and is rigidly mounted on the end of a contact rod 31 which is pivotally connected by means of a pivot pin 33 to one end of a floating switch arm 35. The switch arm 35 at its upper end is formed at right angles as at 37 to provide a latch surface 39 for engaging a pivoted latch member 41. The formed portion 37 of the switch arm 35 also provides a convenient back to which one end of a spring 43 is attached. The other end of the spring 43 is hooked over a spring stud 45 in the base 11 and the spring biases the switch arm 35 about a pivot pin 47 when the latch member 41 is actuated to release the switch arm.

Mounted on the pivot pin 47 is a roller 51 which engages a generally triangular opening 53 in the base 11, the roller being guided in an arcuate slot 49 at the left-hand end of the opening 53. The walls of the slot 49 are generally concentric with the latch point 39 so that the switch arm 35 is guided for pivotal movement about the latch point 39 and is held against substantial longitudinal movement. A pair of spaced links 55 (only one being shown) are disposed one on each side of the base 11 and are pivotally supported on the pin 47. The other ends of the links 55 carry a pin 59 which extends through the opening 53 and supports a roller 61 cooperating with an arcuate surface 63 of the opening 53.

An operating handle 65 of molded insulating material has an integral arcuate portion 67 adapted to slide on an arcuate surface 69 of the housing 11 between an "on" and an "off" position. A pair of operating springs 71 have one end hooked over the pin 59 on opposite sides of the housing 11 and the other ends of the springs are attached to opposite ends of a spring support 73 which straddles the arcuate portion 67 of the handle 65. The arcuate portion 67 of the handle 65 is provided with inwardly extending portions 75 (only one being shown) which embrace the arcuate portion 69 of the housing to retain the handle substantially centered on the arcuate portion 69.

In the "on" position of the handle 65 the line of action of the operating springs 71 is below a line drawn through the centers of the pins 47 and 59 thus biasing the roller 61 into the lower right-hand portion 85 of the opening 53, and, through the links 55, holds the roller 51 in the left-hand end of the opening 53 thus holding the switch arm 35 in the closed position. Also, in the "on" position of the handle the line of action of the springs 71 is below the center about which the arcuate surface 69 is drawn and about which the handle 65 moves, thus biasing the handle to the "on" position.

When the operating handle 65 is moved upwardly from the "on" position, it moves the line of action of the springs 71 above the line 47—59 at which time a component of force of the springs biases the roller 61 upwardly and causes the roller together with the associated ends of links 55 to move upwardly and toward the right with a snap action. The roller travels along the arcuate surface 63 and is stopped by engagement with the upper right-hand end 87 of the opening 53. This movement of the roller 61 acts through the links 55 to move the switch arm 35 to the open position with a snap action, the opening movement of the switch arm being stopped by engagement of the lower end thereof with a portion 83 of the base 11.

The breaker contacts are closed by movement of the operating handle 65 from the "off" position back to the "on" position. During this movement of the handle the line of action of the operating springs 71 crosses over below the center about which the surface 63 is struck, at which time the springs bias the roller 61 downwardly and causes it to move down along the arcuate surface 63 to the lower position with a snap action. This movement of the roller 61 acts through the links 55 to close the contacts with a snap action. The fact that this opening spring 43 acts on the switch arm 35 adjacent the latched end 37 has the advantage that this spring 43 does not have to be overcome by the operating springs 71 on each manual operation, since the end 37 of the switch arm remains substantially stationary, having only a generally pivotal movement about the latched end 37.

The switch arm 35 is automatically moved to the open position by the spring 43 upon actuation of the latch member 41 which is effected by the trip device 17. The latch 41 is pivoted on a pin 89 in the base 11 and is biased by spring 91 to latching positon to releasably restrain the switch arm 35 in the closed position. When the latch 41 is actuated to unlatched position, releasing the upper end of the switch arm 35, the spring 43 acts to rotate the switch arm counterclockwise about the pivot pin 47 to effect opening of the contacts. The switch arm is shown by dot and dash lines in the tripped open position where it is stopped by engagement with the portion 83 of the base 11. The operating mechanism including the pin 47, links 55, springs 71 and the operating handle 65 all remain in the position shown during an automatic opening operation.

In addition to the latch member 41, the trip device 17 includes a U-shaped latch actuator 93 pivoted on a pin 95 and biased by a spring 97 in a clockwise direction. One arm 99 of the latch actuator 93 is normally engaged by a latch 101 rigidly mounted on the free end of a bimetal element 103 to releasably hold the latch actuator in operative position. The other arm 105 of the latch actuator has a projection 107 thereon adapted to engage an ear 109 formed on the end of the latch member 41 and actuate the latter upon release of the actuator 93. The two arms 99 and 105 of the latch actuator are connected by an integral yoke portion 111 to which one end of the spring 97 is attached, the other end of the spring being hooked over a pin 113 in the base 11.

The bimetal element 103 is rigidly secured to a yoke member 115, the legs of which are pivotally supported on a pin 117 mounted in a boss 119 formed on the base 11. One leg 121 of the yoke member 115 extends to the right from the pivot 117 and an adjusting screw 125 threadedly engages an opening near the free end thereof. The adjusting screw 125 extends out through an opening in the base 11 and a knurled head 127 on the outer end of the screw bears against the base 11. A spring 129, compressed between a spring seat 131 on the base 11 and a spring guide 133 on the leg 121 of the yoke member 115, biases its yoke member and the bimetal element 103 in a clockwise direction about the pivot pin 117. By turning the screw 127, the bimetal assemblage may be moved in either direction according to the direction the screw 127 is turned. This varies the amount of overlap by the latch 101 and thereby varies the tripping time of the breaker.

An electromagnet 135 is mounted on the upper part of the base 11 to the left of the trip device 17. The electromagnet comprises a U-shaped core member 137 and an energizing coil 139 mounted on one leg of the core. An armature 141 is rigidly mounted on the yoke portion of the latch member 41 and extends to the left therefrom adjacent the pole faces of the U-shaped magnet yoke 137.

The circuit through the circuit breaker extends from a terminal conductor 143 through the separable contact structure 13, the switch arm 35, a flexible conductor 145, through the coil 139 of the electromagnet 135, a flexible conductor 147 to the mounted end of the bimetal element 103 and through the bimetal element to a terminal conductor 149.

When an overload current below a predetermined value occurs in the circuit through the breaker, the bimetal element 103 becomes heated, and when heated a predetermined amount, bends upwardly causing the latch 101 to release the latch actuator 93 whereupon the spring 97 snaps the actuator 93 sharply clockwise about the pivot 95 causing the projection 107 to engage the ear 109 on the latch member 41 and move this member to unlatching position to release the upper end of the switch arm 35. The spring 43 thereupon moves the switch arm about the pivot 47 to the open position with a snap action.

The mechanism is reset and relatched following an automatic opening operation by moving the handle to the "off" position. During this movement of the operating handle the operating mechanism is actuated to the open position. This moves the upper or latch end 37 of the switch arm 35 to the right of the latch surface 39 on the latch member 41 permitting the spring 91 to restore the latch member 41 to latching position. As the handle 65 nears the "off" position, the projection 75 thereon engages and rotates the latch actuator 93 counterclockwise to effect relatching of the actuator with the latch 101 on the bimetal element 103. The contacts are then closed by movement of the operating handle to the "on" position in the previously described manner.

Figure 2:
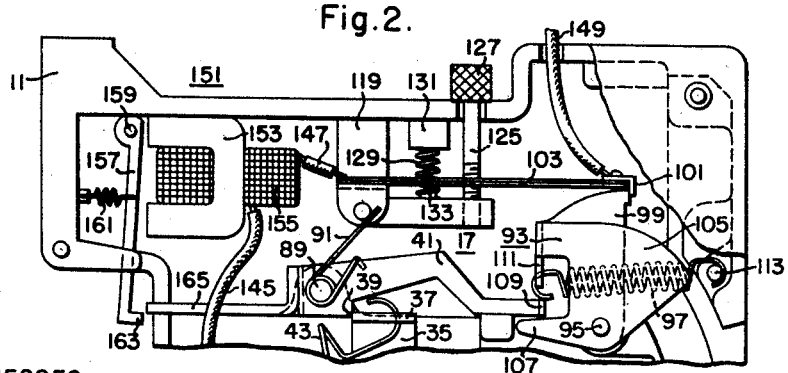
Fig. 2 is an elevational view of a modification of the trip device.
Figure 3:
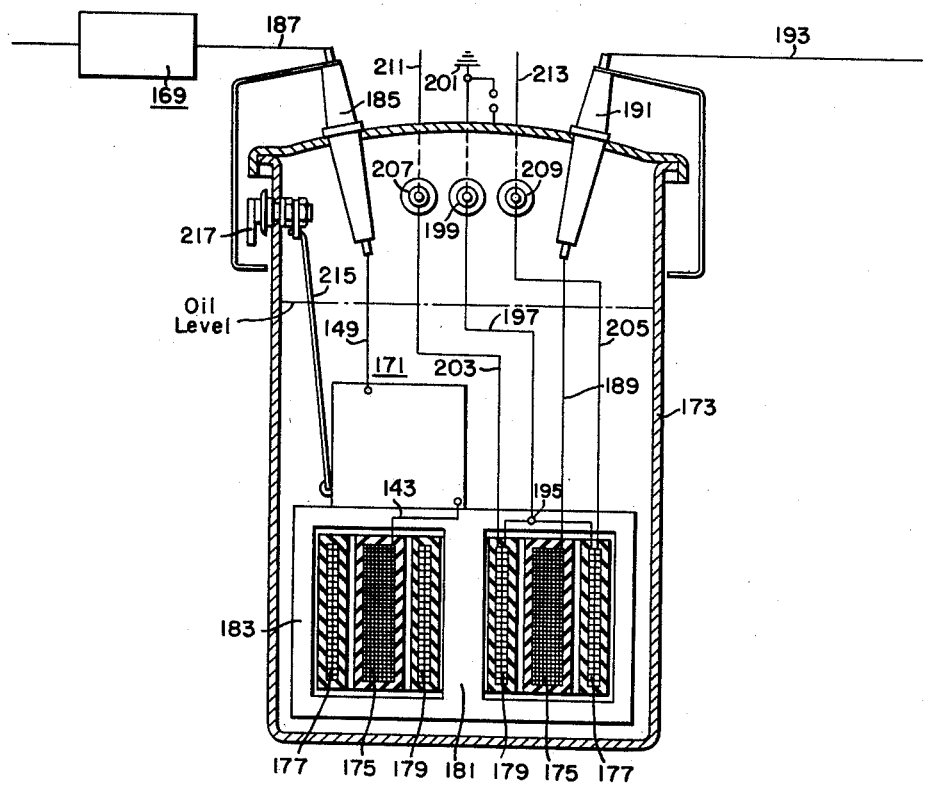
Fig. 3 is an elevational sectional view of a distribution transformer showing the circuit breaker connected in the high voltage side.

Referring to Fig. 3, which shows a distribution transformer having the circuit breaker of Figs. 1 and 2, indicated generally at 171, mounted therein, the transformer comprises a casing 173 filled with oil to the level indicated in Fig. 3, a primary or high-voltage winding 175 and a secondary or low-voltage winding having two parts 177 and 179 which may be disposed without and within the primary winding 175, the several windings being positioned about a leg 181 of a magnetic core structure 183 in a well-known manner.

The high-voltage winding 175 is connected through conductor 143 (see also Fig. 1) to the circuit breaker 171 and by the conductor 149 through a bushing 185 to a feeder circuit conductor 187. The other side of the high-voltage winding 175 is connected through a conductor 189 and a bushing 191 to a feeder circuit conductor 193.

The low-voltage windings 177 and 179 may have two of their terminals connected together as at 195 which is connected by a conductor 197 extending through a bushing 199 in the casing wall to ground at 201. The other terminals of the low-voltage windings are connected by conductors 203 and 205 which extend through bushings 207 and 209 to circuit conductors 211 and 213 which comprise the secondary or distribution load conductors.

The circuit breaker will interrupt the circuit in response to overload currents up to a predetermined magnitude, that is, up to the interrupting capacity of the breaker. When an overload current or fault current of greater magnitude occurs in the feeder circuit 187 (Fig. 3), the electromagnet 135 is energized sufficiently by the fault current to attract and hold the armature 141 and the latch member 41 with sufficient force to prevent movement of the latch 41 to unlatching position by the latch actuator 93 when the latter is released by thermal bending of the bimetal element 103 in response to the fault current. The circuit breaker will thus be held closed until the feeder circuit 187 is opened by the operation of the back-up or reclosing circuit breaker 169 (Fig. 3). Opening of the circuit through the circuit breaker deenergizes the electromagnet 135. The latch actuator 93 then functions under the influence of its spring 97 to move the latch member 41 to unlatching position to effect opening of the contacts thus taking the transformer out of the faulted circuit.

In the modification of the trip device shown in Fig. 2 of the drawing, the latch member 41 is positively latched against tripping movement instead of being magnetically held. An electromagnet 151 is mounted on the upper portion of the base 11. The electromagnet comprises a U-shaped core member 153 and an energizing coil 155 mounted on the yoke portion of the core. An armature 157 is pivotally mounted on a pin 159 adjacent the upper leg of the core 153 and is biased to unattracted position by a spring 161. The free end of the armature 157 is provided with a latch portion 163 adapted to cooperate with a member 165 rigidly secured to the yoke portion of the latch member 41.

The trip device shown in Fig. 2 will effect opening of the circuit breaker in the manner previously described in response to overload currents up to a predetermined value, that is, up to the interrupting capacity of the breaker. When an overload current or a fault current of greater magnitude occurs, the electromagnet 151 (Fig. 2) is energized and attracts the armature 157 engaging the latch portion thereof with the member 165 thus positively latching the latch member 41 against unlatching movement by the latch actuator 93 when the latter is released by thermal bending of the bimetal element 103 in response to the fault current. Tripping of the circuit breaker is thus prevented until the feeder circuit is opened by operation of a back-up circuit breaker as a reclosing circuit breaker. When the circuit through the circuit breaker is thus opened, the electromagnet 151 (Fig. 2) is deenergized and the spring 161 immediately moves the armature 157 to unlatching position, whereupon the latch actuator 93 moves the latch member 41 to its unlatching position and effects opening of the circuit breaker in the previously described manner. The mechanism is reset and relatched and the contacts closed in the manner previously described.

The manual operating handle 65 may be connected by means of a suitable operating linkage 215 (Fig. 3) to manual operating means 217 outside the transformer in a well-known manner so that the breaker can be manually opened and closed, and the breaker mechanism can be reset and the contacts reclosed from outside the transformer casing.

The invention provides a circuit breaker for the protection of the high voltage side of a distribution transformer which is responsive to overload currents below a predetermined value on the feeder circuit to open the circuit, which maintains the circuit closed on fault currents above the predetermined value and which functions as a disconnect switch to isolate the transformer from the faulted circuit after the faulted circuit has been opened by a back-up protective device.

Connecting the circuit breaker in the high-voltage side of the transformer eliminates the use of the protective links as fuses usually provided for the protection of the high-voltage side of such transformers. It is necessary to replace the protective links once they have blown, whereas the circuit breaker is reset and closed, after the back-up breaker has cleared the feeder line, by manipulation of the element 217 (Fig. 3). Any internal trouble in the transformers of such nature as would heat the oil therein, would heat the bimetal element and effect tripping of the circuit breaker.

Having described the invention in accordance with the provisions of the patent statutes, it is to be understood that various changes and modifications may be made in the structural details thereof without departing from the spirit of the invention.

I claim as my invention:

1. In a circuit breaker having separable contact means and operating means therefor, the combination of a switch member movable to open said contact means, a latch member engaging and releasably holding said switch member in closed position, a biased releasable latch actuator operable when released to engage and move said latch member to unlatching position, current responsive means normally restraining said latch actuator operable in response to overload currents to release said latch actuator, said latch member being free of said current responsive means, and electroresponsive means operable in response to overload currents above a predetermined magnitude to prevent operation of said latch member while permitting operation of said current responsive means.

2. In a circuit breaker having separable contact means and operating means therefor, the combination of a switch member movable to effect separation of said contact means, a latch member normally engaging and releasably restraining said switch member in closed position, a releasable latch actuator operable when released to engage and move said latch member in unlatching direction, latch means releasably restraining said latch actuator in operative position, a bimetal element normally restraining said latch actuator and operable when heated a predetermined amount in response to overload currents to actuate said latch means and release said latch actuator, said latch member being normally free of said bimetal element, and electroresponsive means responsive to overload currents of predetermined magnitude to prevent operation of said latch member by said latch actuator while permitting operation of said bimetal element.

3. In a circuit breaker comprising separable contact means and operating means therefor, the combination of a switch member movable to effect separation of said contact means, a latch member normally engaging and releasably restraining said switch member in closed position, a releasable latch actuator operable when released to engage and move said latch member in unlatching direction to release said switch member, current responsive means operable in response to overload currents to effect release of said latch actuator, an electromagnet responsive to overload currents above a predetermined magnitude, said electromagnet having an armature on said latch member operable when said electromagnet is energized by overload currents above said predetermined magnitude to hold said latch member in latching position against the action of said latch actuator to thereby prevent release of said switch member.

4. In a circuit breaker comprising separable contact means and operating means therefor, the combination of a switch member movable to effect separation of said contact means, a latch member normally engaging and releasably restraining said switch member in closed position, a biased releasable latch actuator operable when released to engage and move said latch member in unlatching direction to release said switch member, current responsive means normally releasably restraining said latch actuator and operable in response to overload currents to effect release of said latch actuator, an electromagnet responsive to overload currents above a predetermined magnitude, said electromagnet having an armature mounted on said latch member operable when said electromagnet is energized by overload currents above said predetermined magnitude to hold said latch member in latching position to thereby prevent release of said switch member, means effecting deenergization of said electromagnet, and said latch actuator when said electromagnet is deenergized actuating said latch member to release said switch member.

5. In a circuit breaker having separable contact means and operating means therefor, the combination of a switch member movable to effect automatic separation of said contact means, a latch member normally engaging and holding said switch member in closed position, a releasable latch actuator biased to engage and move said latch member in unlatching directions to effect release of said switch member, current responsive means normally releasably restraining said latch actuator and operable in response to overload currents to release said latch actuator, an armature mounted on said latch member, and electromagnetic means when energized holding said armature and said latch member in latching positions to prevent release of said switch member.

6. In a circuit breaker comprising separable contact means and operating means therefor, the combination of a switch member biased to open position and movable to effect opening of said contact means, a pivoted latch member having a latch surface disposed on one side of its pivot normally engaging and releasably restraining said switch member in closed position, a bimetal element operable in response to overload currents to effect movement of said latch member in unlatching direction to release said switch member, an armature mounted on said latch member on the opposite side of its pivot from said latch surface, and electromagnetic means disposed when energized to hold said armature and said latch member in latching position to prevent release of said switch member.

7. In a circuit breaker comprising separable contact means and operating means therefor, the combination of a switch member biased to open position and movable to effect opening of said contact means, a pivoted latch member having a latch surface disposed on one side of its pivot normally engaging and releasably restraining said switch member in closed position, a bimetal element operable in response to overload currents to effect movement of said latch member in unlatching direction to release said switch member, an armature mounted on said latch member on the opposite side of its pivot from said latch surface, and electromagnetically disposed when energized to hold said armature and said latch member in latching position to prevent release of said switch member, and said electromagnet when deenergized permitting unlatching movement of said latch member.

8. In a circuit breaker having separable contact means and operating means therefor, the combination of a switch member movable to open and close said contact means, a latch member engaging and releasably holding said switch member in closed position, a releasable latch actuator operable when released to engage and move said latch member to unlatching position, current responsive means operable in response to overload currents to release said latch actuator, latch means biased to unlatching position and movable to latching engagement with said latch member, and electroresponsive means operable when energized in response to overload currents above a predetermined value to move said latch means to latching position to thereby prevent operation of said latch member by said latch actuator.

9. In an electrical transformer comprising a casing having a liquid dielectric therein, the combination of a circuit breaker immersed in said dielectric comprising separable contact means connected in series relation with the high-voltage winding of said transformer, a switch member movable to open said contact means, a latch member releasably restraining said switch member in closed position and movable to release said switch member, a releasable latch actuator operable when released to move said latch member to unlatching position and effect opening movement of said switch member, current responsive means operable in response to overload currents to release said latch actuator, and electroresponsive means including an armature on said latch member responsive to fault conditions to prevent releasing movement of said latch member by said latch actuator and opening of said contact means until said fault condition is cleared.

10. In an electrical transformer comprising a casing, the combination of a circuit breaker in said casing comprising separable contact means connected in series relation with the high-voltage winding of said transformer, a switch member movable to open said contact means, a latch member releasably restraining said switch member in closed position and movable to release said switch member, a releasable latch actuator operable when released to move said latch member to unlatching position and effect opening movement of said switch member, current responsive means operable in response to overload currents to release said latch actuator, and electroresponsive means including an armature on said latch member responsive to fault conditions to prevent releasing movement of said latch by said latch actuator member and opening of said contact means until said fault condition is cleared, means external of said transformer for clearing said fault, and said latch actuator when said fault condition is cleared actuating said latch member to release said switch member and effect opening of said contact means.

References Cited in the file of this patent
UNITED STATES PATENTS

| | | |
|---|---|---|
| 2,314,693 | Dickinson | Mar. 23, 1943 |
| 2,572,637 | Lincks | Oct. 23, 1951 |
| 2,686,242 | Leonard | Aug. 10, 1954 |